United States Patent [19]
Waly

[11] 3,806,708
[45] Apr. 23, 1974

[54] ENCODED MICRORECORD SYSTEM

[75] Inventor: Adnan Waly, Stamford, Conn.

[73] Assignee: Personal Communications, Inc., Stamford, Conn.

[22] Filed: Nov. 24, 1972

[21] Appl. No.: 309,090

Related U.S. Application Data

[63] Continuation-in-part of Ser. No. 135,996, April 21, 1971, abandoned.

[52] U.S. Cl. ........................ 235/61.11 E, 250/219 Q
[51] Int. Cl. ........................ G06k 7/14, G08c 9/06
[58] Field of Search ......... 235/61, 11 E; 250/219 R, 250/219 Q, 219 D, 219 FR; 340/173 LT; 35/48; 353/26

[56] References Cited

UNITED STATES PATENTS

| | | | |
|---|---|---|---|
| 3,655,949 | 4/1972 | Rinn | 235/61.11 E |
| 3,560,716 | 2/1971 | White | 235/61.11 E |
| 3,656,120 | 4/1972 | Maure | 235/61.11 E |
| 3,700,320 | 10/1972 | Brewer et al. | 235/61.11 E |
| 3,731,063 | 5/1973 | Bickl et al. | 235/61.11 E |

*Primary Examiner*—Daryl W. Cook
*Attorney, Agent, or Firm*—Michael Ebert

[57] ABSTRACT

An encoded microrecord system making use of a microrecord having a plurality of data-sets formed therein, each set representing a single printed page or an equivalent body of intelligence, so that all pages of a large book or other document may be stored on the microrecord. Each data-set in the microrecord is dissected into discrete sub-sets. The sub-sets, which together form a data-set, are dispersed on the surface of the microrecord to create a pattern of sub-sets, the various sub-sets derived from the plurality of data-sets being interlaced with each other whereby each data-set occupies a distinct pattern position on the microrecord. Each recorded data-set also includes coded-data germane to the items of intelligence that compose the data-set. The encoded data-set is reproduced by a reader adapted to present any one of the recorded data-sets and its accompanying coded-data, to the exclusion of all other sets. Means are provided to scan coded-data related to a selected item of intelligence in the data-set presented by the reader to produce corresponding electrical signals for transmission to a utilization point.

9 Claims, 7 Drawing Figures

ENCODED MICRORECORD SYSTEM

RELATED APPLICATION:

This application is a continuation-in-part of the copending application Ser. No. 135,996, filed Apr. 21, 1971 (to issue as U.S. Pat. No. 3,704,068 on Nov. 28, 1972).

BACKGROUND OF THE INVENTION

This invention relates generally to a micro-image recording and reproducing system in which interlaced micro-images appearing on a multiple-image microrecord may be read back by an optical reader, and more particularly to a system wherein each micro-image includes coded-data germane to items of intelligence borne by the micro-image, which coded-data may be selectively extracted from the reader when a particular micro-image is presented, to provide output signals for carrying out functions related to the intelligence of interest.

In my co-pending patent application above-identified, there is disclosed a micro-image recording and reproducing system constituted by a microrecord for recording intelligence, and a reader for reproducing the recorded intelligence.

In the microrecord, a plurality of data-sets is formed on a record medium such as a film sheet. Each data-set represents a distinct page or an equivalent body of intelligence, and is composed of a multiplicity of discrete sub-sets each including at least one data bit such as an alphabet letter. The sub-sets, which together form a data-set, and which may be one page of a particular book, are dispersed on the record according to a predetermined pattern. The dispersed sub-sets forming the plurality of data-sets (i.e., all the pages of this book) are interlaced with each other, whereby each data-set occupies a distinct pattern position on the record and may be optically extracted from the record.

The multiple-image microrecord is reproduced by a reader having a lens matrix defined by a planar array of lensettes, each of which lies in optical registration with a respective sub-set of a presented data-set, and serves to project this sub-set over a short distance onto a screen parallel to the lens matrix. Means are provided to index the microrecord relative to the matrix, whereby with each incremental shift, a different data-set is aligned with the lens matrix, thereby successively presenting the individual micro-images on the screen.

If, therefore, each data-set represents one page from a telephone directory having a thousand or more pages, all of these pages may be recorded in an interlaced manner as micro-images on the microrecord, and each page may be selectively presented on the screen of the reader.

As pointed out in the above-identified copending application, in the case of a micro-recorded telephone directory one may incorporate in each entry giving the name and phone number of a subscriber, code indicia representing this number. This coded entry may take the form of a five-bit code corresponding to the telephone number and it may be automatically transferred in electrical terms onto the touch-button or dial telephone system, without introducing a source of error.

In other words, instead of the usual manual dialing operation to produce pulses or tones representative of the numbers and letters dialed, the code associated with the selected entry may be scanned to produce the desired pulses or tones. This arrangement precludes error for as long as the proper entry is selected, the cited message which is transmitted is not subject to human intervention.

Another application for this invention is in connection with mail-order catalogues, such as that published by Sears-Roebuck. In this instance, the single microrecord will contain all of the pages of the catalogue. By recording coded data related to each catalogue item or advertised article on each recorded page, it becomes possible when presenting a particular page in the reader, to select any item therein, and to then press a button causing a transfer of the related coded data, in electrical terms, to a remote station where the selected item may be taken from stock for shipment to the customer, or where various accounting or inventory functions may be carried out.

While the invention will hereinafter be described in connection with an encoded microrecord of a telephone directory, it is to be understood that it is by no means limited to this application, or for that matter to mail-order catalogues, for the invention is useful wherever one wishes to select a particular item of intelligence from a reproduced document, and to transmit to an external utilization station, information related to the selected item.

SUMMARY OF THE INVENTION

In view of the foregoing, it is the primary object of this invention to provide a micro-image recording and reproducing system in which interlaced micro-images appearing on a microrecord also include coded data germane to these images, which microrecord may be read back by a reader that is also capable of selectively extracting coded data from the projected micro-image to produce output signals for carrying out functions related to the selected intelligence.

Also an object of the invention is to provide a system of the above type which is of simple and low-cost design, and which operates efficiently.

Briefly stated, these objects are accomplished in an encoded system constituted by a coded microrecord, a reader adapted selectively to present any one of the data-sets contained on the microrecord, and each data set representing a page of intelligence to which is added coded data germane to the items of intelligence, and means associated with the reader to extract the coded data from the presented data-set to produce corresponding electrical signals for transmission to a utilization station.

OUTLINE OF THE DRAWING

For a better understanding of the invention, as well as other objects and further features thereof, reference is made to the following detailed description to be read in conjunction with the accompanying drawings, wherein:

FIG. 1 schematically shows a microrecord projection system illustrative of certain principles underlying the invention;

DESCRIPTION OF THE INVENTION

General Principles:

In a microrecord in accordance with the invention, the characters or bits of information constituting the text or subject matter of a single page or document to be recorded are interlaced with the characters or bits of information constituting the text or subject matter of the many other pages or documents recorded on the same microrecord.

If, therefore, we assume that each page has a maximum character or bit capacity of 1,000, the 1,000 characters or bits representing each page or document will be so distributed and spaced from each other on the micro-record so as to form a particular character pattern thereon, whose position is distinct from the character patterns representing all other pages or documents recorded on the same micro-record.

The lens matrix which cooperates with the multiple-microimage record or microrecord is formed by a planar array of lensettes having short focal lengths, the lensettes being distributed and so spaced from each other on the matrix as to optically register with the respective characters in that character pattern on the micro-record which is disposed in alignment with the matrix.

Hence by indexing the microrecord relative to the lens matrix, one may bring the various character patterns representing individual pages and documents into sequential alignment with the matrix, and thereby project the text thereof to the viewer, one page at a time. Assuming a simple indexing mechanism operated by pressing a button or pushing a lever, and a reader in flat form, one may then read a microrecord of a book very much in the fashion of a book, with the reader held in the hands of the user.

Figure 1:
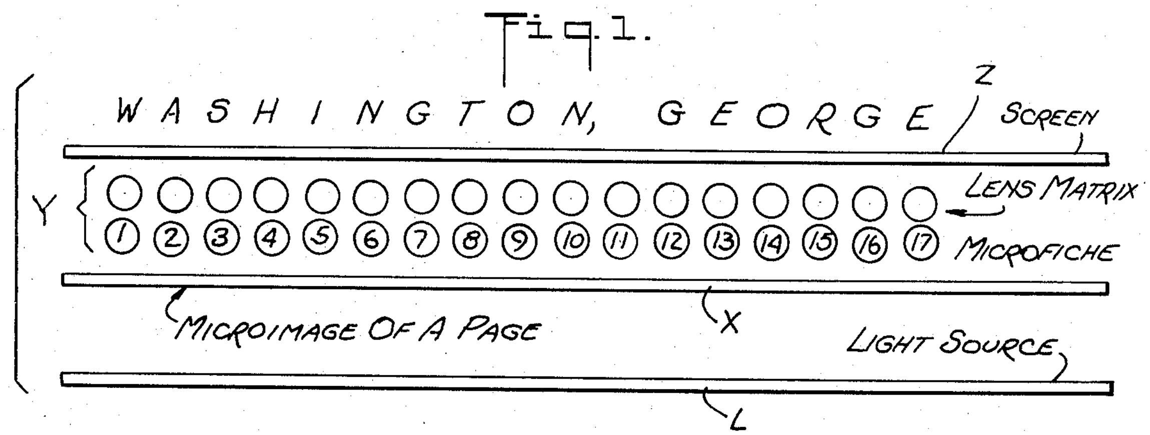

But before considering in detail the nature of the microrecord having interlaced character patterns, and the structure of the reader for projecting this unique micro-record, we shall, in connection with FIG. 1, first analyze in highly simplified form, a microfiche projection arrangement illustrative of certain principles underlying the present invention.

The transparent microfiche is designated by the letter X, the lens matrix therefor is designated by Y, and the screen onto which the characters are projected is designated by Z. Illumination of the microrecord is provided by a suitable light source L. On the microrecord, there appears a single line of text, composed of seventeen characters spelling "Washington, George."

The lens matrix consists in the example, of seventeen lensettes numbered 1 to 17, the lensettes being linearly spaced and in optical registration with the seventeen characters on the microfiche parallel to the matrix. Thus lensette Number "1" projects character "W" on the screen, lensette number "11" projects character "," on the screen, and lensette 17 projects character "E" on the screen.

Each lensette may be in the form of a small acrylic bead. A bead is incapable of projecting a whole micro-page of say, 0.168 × 0.130 inches, except very imperfectly, for serious pin cushion distortion would be encountered and only a central portion of the page would be readable, even if the lens were carefully focused.

However, when a lens of this tiny size, which is herein termed a "lensette," is used to project only a single character of a sub-set rather than a whole page, no disturbing distortion of the projected character is experienced even with a very cheaply molded lensette. The term "data-set" as used herein refers to the intelligence contained on the whole page of data to be recorded, whereas when the data-set is dissected into bits or pieces, each piece is referred to as a "sub-set."

The observer views the screen in the usual way at normal viewing distance. Screen Z may be a conventional translucent projection screen, but improved viewing is achievable with a directional screen, that is a screen with pronounced forward scatter, or having a fresnel-type lens placed above or below the screen.

Thus with the characters or sub-sets on the microrecord in alignment with the axes of the lens system, and with the magnification and apertures such that each lensette exclusively shows a respective sub-set on the screen, one is able to read the entire data set without distortion.

This novel technique for recording and organizing information so that characters are projected by individual lensettes, is highly efficient, for the whole microrecord can be filled completely with characters or bits of information, provided that these bits are recorded in an interlaced manner as previously described.

Figure 2:
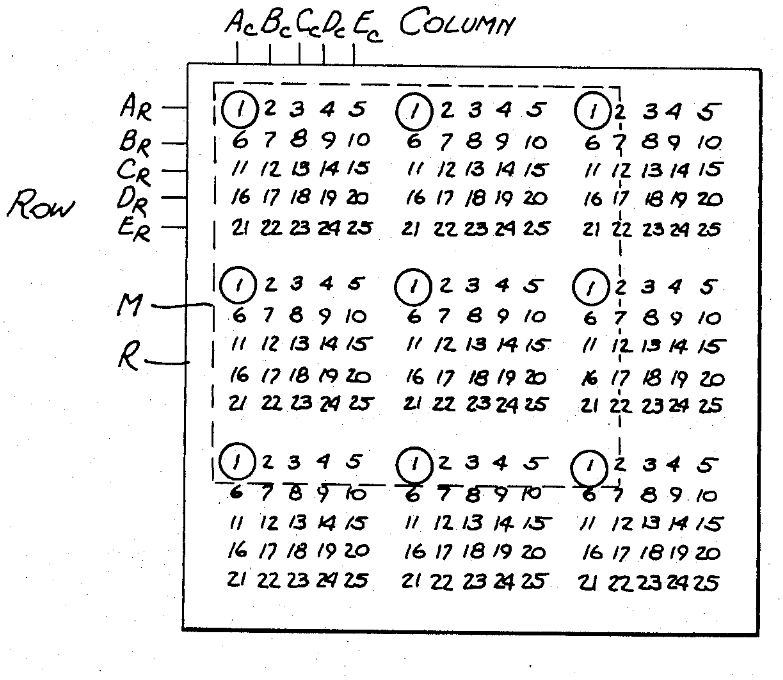
FIG. 2 illustrates in plan view an interlaced multiple-image microrecord according to the invention.

Micro-records:

Referring now to FIG. 2, there is shown a microrecord R on which, to simplify the example, only twenty-five pages of text or documentation are recorded in the form of interlaced character patterns.

All of the various characters such as the letters of the alphabet which together constitute the text of page one, are represented in the Figure by the number "1." It will be seen that the numbers "1" are distributed over the record and are spaced from each other to create a character pattern having a generally rectangular formation. The numbers "1" in the character pattern all lie in optical registration with an array of lensettes in a lens matrix M. The lenses are represented by circles which enclose the numbers "1." Hence the lensette pattern corresponds to the pattern of characters recorded in the record R.

It will also be seen that the total number of "1's" in the character pattern is nine, there being three lines with three "1's" in each line. Obviously, this is a gross simplification, for in actual practice, the maximum number of characters per page may be well over a thousand characters or bits of information.

The characters which together constitute the text of the second page are represented by numbers "2," those representing the text of page three by the numbers "3," and so on until we reach page 25, represented by numbers "25." Each pattern of numbers occupies an interlaced position determined by its column and row setting which is distinct from every other pattern. Consequently by selectively indexing the record R relative to lens matrix M, each character pattern may be brought into exact alignment with the matrix for separate projection and readout.

In the interlaced pattern shown in FIG. 2, the arrangement is such as to permit indexing in the X and Y directions to effect a total read-out of all 25 patterns. To illustrate how this action takes place, we have identified the first five columns on the micro-record by letters $A_c$, $B_c$, $C_c$, $D_c$, and $E_c$ and the first five rows by the letters $A_r$, $B_r$, $C_r$, $D_r$, and $E_r$.

Hence when record R is so aligned with the matrix M that the lensettes are in registration with the successive column and row settings in the X and Y directions, all 25 pages can be read out one-by-one.

Figure 3:
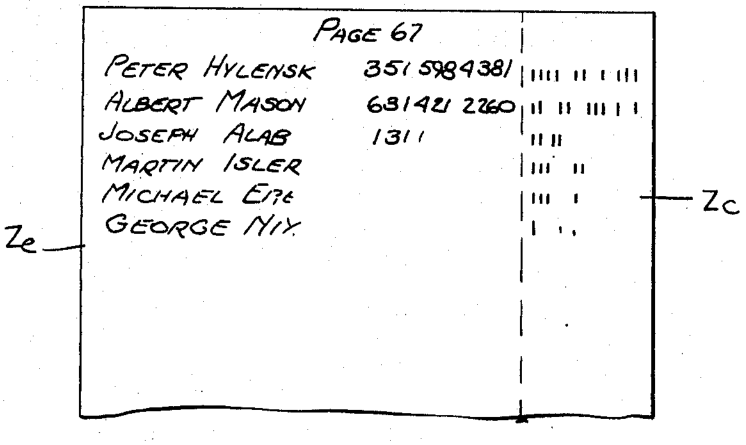
FIG. 3 shows a single page of a telephone directory to be recorded on a microrecord, and containing code data related to the subscriber entries.

Reader:

Referring now to FIG. 3, we shall consider a microrecord of a telephone directory, of which only one page (page 67) is shown. This page has been simplified so that all entries are in one long column, each entry consisting merely of the name of a subscriber and his telephone number. This is followed by code indicia in the form of a series of bars or other indicia reflecting the telephone number.

Thus, each entry which represents one item of intelligence is followed by code-data germane thereto. The code-data for the several entries on the page all lie in a code zone Zc along the right margin of the page, the related entries lying in the entry zone *Ze*. In practice, the code zone may be in any area that is segregated from the related items of intelligence.

If now the many pages of this telephone directory are recorded on a microrecord in accordance with the invention, each data-set represented by a respective page will be dissected to create a pattern of discrete sub-sets, and the sub-sets representing the many data-sets will be interlaced in the manner described in greater detail in the above-noted co-pending application.

Figure 4:
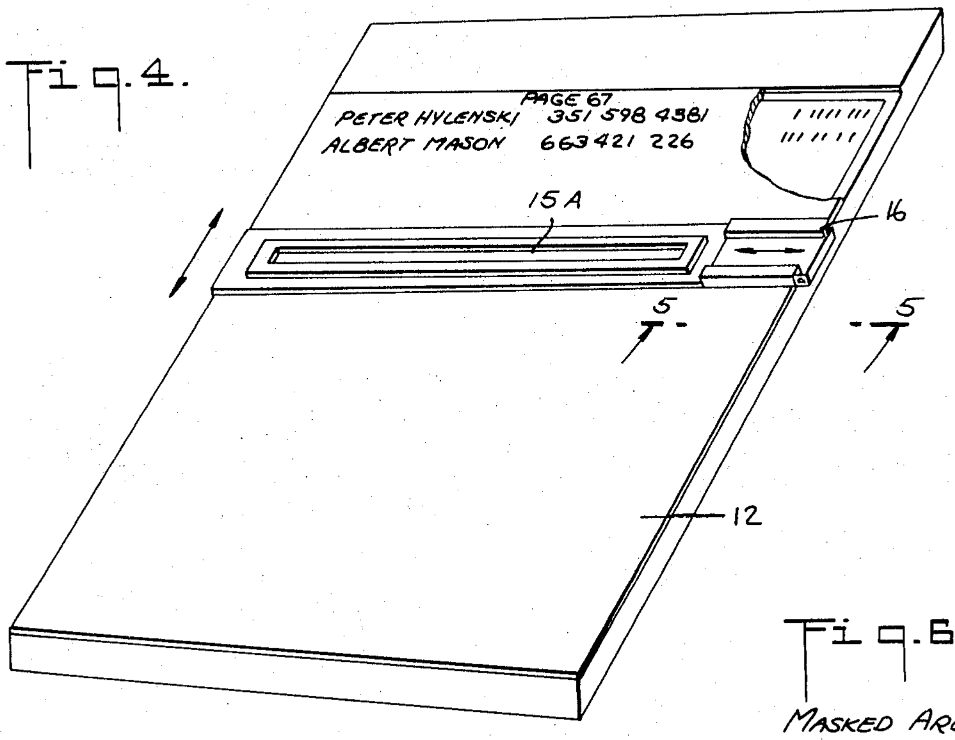
FIG. 4 shows in perspective a reader in accordance with the invention.
Figure 6:
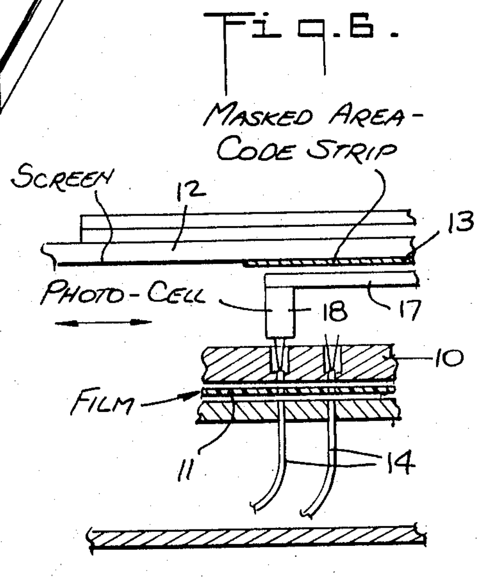
FIG. 6 is an enlargement of the portion of the Figure encircled in FIG. 5.
Figure 5:
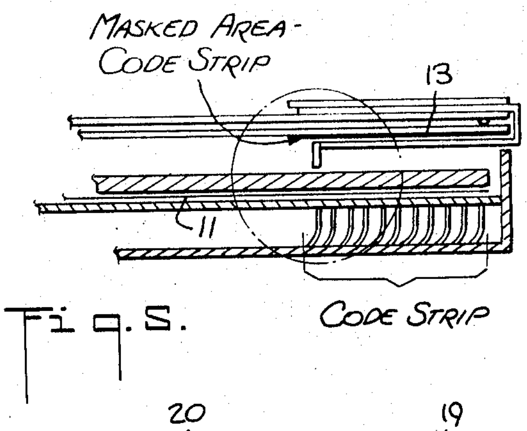
FIG. 5 is a transverse section taken in the plane indicated by line 5—5 in FIG. 4.

When the microrecord is reproduced in a reader, as shown in FIG. 4, the reader, which includes an indexing mechanism (not shown), will present a selected page from the directory, such as page 67, shown in FIG. 3.

The reader includes a lens matrix provided with lensettes 10A, 10B, etc., each of which is trained on a respective sub-set on the microrecord 11. The position of the microrecord relative to the stationary matrix 10 is adjustable to bring a desired data-set in registration therewith. The matrix lensettes project the sub-sets in the pattern thereof onto a suitable viewing screen 12. However, the screen is provided with a masking strip 13 which blocks the code zone from the screen display. Light is supplied to each of the lensettes on the matrix by means of light-conducting fibers 14, or other suitable means. Thus the presented sub-sets are all illuminated, including the sub-sets which relate to the code-data.

Hence, all the observer sees on the illuminated screen are the subscriber entries, for the code-data is masked. If now the observer wishes to call a particular subscriber, he shifts a guide selector 15 along the screen to align the window 15A on the selector with the name of a particular subscriber. The guide selector is provided with a photoelectric scanner which is constituted by a manually-operated slide 16 that is mechanically linked by a bracket 17 to a photocell 18. This cell is positioned between the screen 12 and matrix 10 and is movable across the image of the code zone presented by the lensettes, to carry out a scanning action.

Since in aligning the guide selector with a given subscriber entry, one then lines up the photocell 18 with the related code data, one is able to read off this data by manually shifting the slide 16 to cause the cell to scan the presented data code. The output of the cell is in the form of electrical pulses comparable to those produced by a telephone dialing system. These pulses may be fed into the telephone line to call the subscriber. This arrangement avoids dialing errors, for once a subscriber is properly selected, his dialing signals will be transmitted when the slide is operated.

Figure 7:
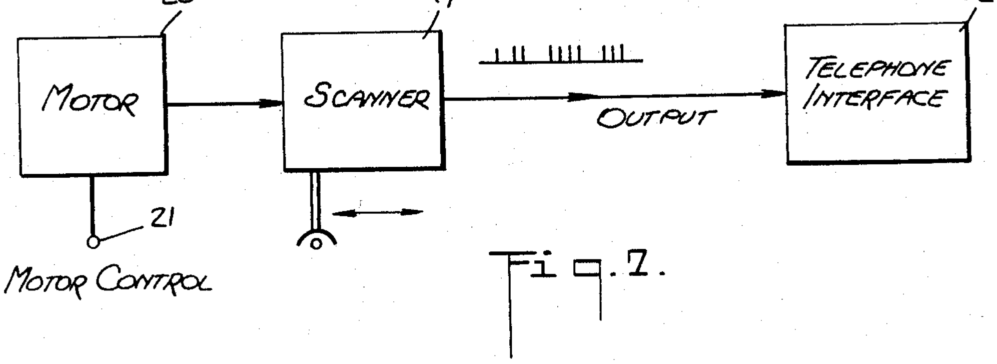
FIG. 7 is a block diagram of a modified scanner in accordance with the invention.

This operation can be mechanized as shown in FIG. 7, by means of a scanner 19 which is reciprocated by a motor 20 when a control button 21 is pressed. The control button is operated only after an entry is selected. The pulsatory output of the scanner is fed to a suitable telephone interface 22. In practice, the operation may be further mechanized by means of a keyboard tied in with a guide selector to cause the selector to move to a position aligned with a selected item on the page presented.

Obviously, the same principles may be applied to other forms of data, such as mail-order catalogues, inventory books, etc., so that when an item is selected, code signals related to selected item of intelligence are transmitted to a remote station.

While there has been shown and described preferred embodiments of an encoded microrecord system in accordance with the invention, it will be appreciated that many changes and modifications may be made therein without, however, departing from the essential spirit of the invention.

I claim:

1. An encoded microrecord system comprising:

A. a microrecord having a plurality of data-sets formed therein, each set representing a single printed page or equivalent body of intelligence, so that all pages of a book or other document may be stored on the microrecord, each data-set being dissected into discrete sub-sets, the sub-sets, which together form a data-set, being dispersed on the surface of the microrecord to create a pattern of sub-sets, the various sub-sets derived from the plurality of data-sets being interlaced with each other whereby each data-set occupies a distinct pattern position on the microrecord, each data-set also including a group of coded data germane to the several items of intelligence that compose the data-set, B. a reader selectively adapted to present any one of the data-sets recorded on the microrecord and its accompanying coded data to the exclusion of all other sets, the selected data-set being presented on a viewing screen, and C. means operating in conjunction with the reader to scan coded data related to a selected item of intelligence in the data set presented by the reader to produce corresponding electrical signals for transmission to a utilization point, said means including a selector guide movable with respect to said screen to a position in registration with a particular item of intelligence and a scanning mechanism linked to said selector guide to effect scanning of the coded data in said group related to said particular item of intelligence.

2. A system as set forth in claim 1, wherein said scanning mechanism includes a photocell which is movable across the presented coded data.

3. A system as set forth in claim 1, wherein the coded data contained in said microrecord is in the form of printed bars or lines representing the bits of a binary code.

4. A system as set forth in claim 1, wherein the coded data appears on the microrecord in an area segregated from the area containing the intelligence to which it is germane, the reader including means to mask the presentation of the coded data from an observer of the presented intelligence.

5. A system as set forth in claim 1, wherein said pages are the pages of a telephone directory and said coded data is indicative of the telephone numbers given in the directory, whereby the corresponding electrical signals produced therefrom may be used to effect automatic dialing.

6. A system as set forth in claim 1, wherein said pages are the pages of a mail-order catalogue and said coded data is related to items displayed in the catalogue, whereby the corresponding electrical signals produced therefrom may be used to carry out functions related to items selected by a customer.

7. A system as set forth in claim 1, wherein said reader includes a lens matrix composed of lensettes each in optical registration with the sub-sets in the pattern thereof selected for presentation.

8. A system as set forth in claim 7, wherein said lensettes project the sub-sets on said screen, which includes means to mask the presentation of the coded data.

9. A system as set forth in claim 1, further including keyboard means for positioning said selector guide to a position determined by which keys are depressed.

* * * * *